United States Patent
Piga et al.

(10) Patent No.: US 9,983,652 B2
(45) Date of Patent: May 29, 2018

(54) BALANCING COMPUTATION AND COMMUNICATION POWER IN POWER CONSTRAINED CLUSTERS

(71) Applicant: Advanced Micro Devices, Inc., Sunnyvale, CA (US)

(72) Inventors: Leonardo Piga, Austin, TX (US); Indrani Paul, Round Rock, TX (US); Wei Huang, Frisco, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 60 days.

(21) Appl. No.: 14/959,669

(22) Filed: Dec. 4, 2015

(65) Prior Publication Data
US 2017/0160781 A1 Jun. 8, 2017

(51) Int. Cl.
*G06F 1/26* (2006.01)
*G06F 1/32* (2006.01)

(52) U.S. Cl.
CPC .................. *G06F 1/3203* (2013.01)

(58) Field of Classification Search
CPC .... G06F 1/3203; G06F 9/5094; G06F 1/3287; G06F 1/329; G06F 1/3228; Y02B 60/142; Y02B 60/1282; Y02B 60/1278
USPC ........................................................ 713/320
See application file for complete search history.

(56) References Cited

U.S. PATENT DOCUMENTS

| | | | |
|---|---|---|---|
| 7,401,310 B1 | 7/2008 | Thaden et al. | |
| 7,770,037 B2 | 8/2010 | Searles et al. | |
| 7,818,592 B2 | 10/2010 | Meier et al. | |
| 8,112,647 B2 | 2/2012 | Branover et al. | |
| 8,510,582 B2 | 8/2013 | Naffziger et al. | |
| 8,924,758 B2 | 12/2014 | Steinman et al. | |
| 2008/0177424 A1* | 7/2008 | Wheeler | G06F 1/3203 700/295 |
| 2014/0007111 A1* | 1/2014 | Targowski | G06F 9/522 718/102 |
| 2014/0298047 A1* | 10/2014 | Holler | G06F 9/5094 713/300 |

(Continued)

OTHER PUBLICATIONS

Cochran, et al., "Pack & Cap: Adaptive DVFS and Thread Packing Under Power Caps", Proceedings of the 44th Annual IEEE/ACM International Symposium on Microarchitecture, Dec. 3-7, 2011, pp. 175-185, ACM, New York, NY, USA.

(Continued)

*Primary Examiner* — Nitin Patel
(74) *Attorney, Agent, or Firm* — Rory D. Rankin; Meyertons, Hood, Kivlin, Kowert & Goetzel, P.C.

(57) ABSTRACT

Systems, apparatuses, and methods for balancing computation and communication power in power constrained environments. A data processing cluster with a plurality of compute nodes may perform parallel processing of a workload in a power constrained environment. Nodes that finish tasks early may be power-gated based on one or more conditions. In some scenarios, a node may predict a wait duration and go into a reduced power consumption state if the wait duration is predicted to be greater than a threshold. The power saved by power-gating one or more nodes may be reassigned for use by other nodes. A cluster agent may be configured to reassign the unused power to the active nodes to expedite workload processing.

17 Claims, 9 Drawing Sheets

(56) References Cited

U.S. PATENT DOCUMENTS

| | | | | |
|---|---|---|---|---|
| 2015/0067356 A1* | 3/2015 | Trichy Ravi | ............ | G06F 1/324 |
| | | | | 713/300 |
| 2015/0370311 A1* | 12/2015 | Eckert | .................. | G06F 1/3296 |
| | | | | 713/323 |
| 2016/0179583 A1* | 6/2016 | Eide | .......................... | G06F 1/28 |
| | | | | 713/320 |
| 2016/0187944 A1* | 6/2016 | Eastep | ...................... | G06F 1/26 |
| | | | | 713/300 |

OTHER PUBLICATIONS

Lefurgy, et al., "Power Capping: a Prelude to Power Shifting", Cluster Computing, Jun. 1, 2008, 20 pages, http://researcher.watson.ibm.com/researcher/files/us-lefurgy/cc2007submit.pdf. [Retrieved Oct. 5, 2015].

Rountree, et al., "Beyond DVFS: A First Look at Performance Under a Hardware-Enforced Power Bound", International Parallel and Distributed Processing Symposium Workshops & PhD Forum (IPDPSW), 2012, 8 pages, http://www.cs.arizona.edu/~dkl/Publications/Papers/hppac12.pdf. [Retrieved Oct. 5, 2015].

Branover, et al., U.S. Appl. No. 14/751,515, entitled "Dynamic Power Management Optimization", filed Jun. 26, 2015, 40 pages.

Piga, Leonardo, U.S. Appl. No. 15/183,625, entitled "Managing Cluster-Level Performance Variability Without a Centralized Controller", filed Jun. 15, 2016, 41 pages.

Terzopoulos et al., "Dynamic Voltage Scaling Scheduling on Power-Aware Clusters under Power Constraints", Proceedings of the 2013 IEEE/ACM 17th International Symposium on Distributed Simulation and Real Time Applications, Oct. 30, 2010, pp. 72-78, IEEE Computer Society, Washington D.C., USA.

\* cited by examiner

BALANCING COMPUTATION AND COMMUNICATION POWER IN POWER CONSTRAINED CLUSTERS

The invention described herein was made with government support under contract number DE-AC02-05CH11231, subcontract number 7216338 awarded by the United States Department of Energy. The United States Government has certain rights in the invention.

BACKGROUND

Technical Field

Embodiments described herein relate to processing devices and more particularly, to balancing computation and communication power in power constrained environments.

Description of the Related Art

Parallel computing is the simultaneous execution of the same application or workload using multiple processing elements (e.g., a multi-node cluster) in order to obtain results faster. A parallel workload can be split up to be executed a piece at a time on many different nodes, and then put back together again at the end to get a data processing result. In order to execute the workload and generate the data processing result, clusters executing parallel applications often use message passing to communicate between nodes, where any of various types of network architectures may be employed to connect the nodes together including torus, mesh, tree, or other types of networks. The nodes of the cluster may utilize any of various types of communication techniques for sharing messages between the nodes. For example, the Message Passing Interface (MPI) is a group of language-independent Application Program Interface (API) specifications which define protocols for nodes to communicate with one another by sending and receiving messages. MPI is widely used in High-Performance Computing (HPC) environments. The nodes of the cluster may utilize an MPI library or another library that provides routines for thread communication via message passing.

In various embodiments, collective communication operations may be utilized in HPC environments. In collective communication, data are redistributed cooperatively among a group of nodes. MPI defines a set of collective communication interfaces, including MPI_ALLGATHER, MPI_ALLREDUCE, MPI_ALLTOALL, MPI_BARRIER, MPI_EBCAST, and MPI_REDUCE. MPI also defines point-to-point communications such as MPI_RECEIVE, MPI_SEND, and MPI_WAIT interfaces.

Recently, emphasis has been placed on power budgeting and power capping, at both the node level and the cluster level. In a power constrained cluster environment, power should be assigned to the nodes in an intelligent way. Techniques that work in a system with unlimited power may not work well in a power constrained environment. In situations where messages are being passed back and forth between nodes, the limited power resources may not be shared among the various nodes in an efficient manner. Additionally, during communication synchronization events, some nodes may be using power efficiently while other nodes are wasting power. For example, a typical parallel processing application may include a computation phase after which messages are exchanged. At the end of the computation phase, there may be a global barrier, and then the nodes may be synchronized. Typically, the first node to reach a barrier will keep polling the network interface card (NIC) to see if it has a message from the other nodes. In this case, the CPU(s) of the first node will stay active to see if the first node has received a message.

SUMMARY

Systems, apparatuses, and methods for balancing computation and communication power in power constrained environments are contemplated.

In one embodiment, a multi-node data processing cluster may operate in a power-constrained environment where the power available to the cluster is limited. The cluster may include a cluster agent which is configured to monitor and manage the power usage of each node and to reassign power assigned to nodes at various processing stages. In one embodiment, each node may include a node agent, where the node agent is configured to power-gate the node in response to detecting one or more conditions. In various embodiments, the cluster agent and node agents may cooperate to reduce power during communication wait phases of a workload and shift power into boosting computation on the critical paths to speed up overall execution of the workload.

In one embodiment, at the beginning of a workload, the cluster agent may be configured to assign an equal amount of power to each node of the plurality of nodes. The cluster agent may assign an amount of power to each node such that the total power cap available to the cluster is utilized. For example, if there are 'N' nodes and the power available to the cluster is 'P' Watts, the cluster agent may assign 'P/N' Watts to each node. The nodes of the cluster may each be assigned separate tasks of a common workload. Some of the nodes may finish early and wait on a message or synchronization event before proceeding. Other nodes may be on the critical path and take longer to finish their assigned tasks. As a first portion of nodes complete their tasks while a second portion of nodes are still processing their tasks, the first portion of nodes may be power-gated, resulting in the total power consumed by the cluster falling far below the power cap. This power savings may then be reassigned to the second portion of nodes by the cluster agent, boosting their power and allowing the second portion of nodes to finish their tasks more quickly. In this way, the nodes which are on the critical path may be assigned additional power during a second phase of the workload processing and thus finish earlier than they otherwise would have if only using the originally assigned power.

In one embodiment, the node agent and/or the cluster agent may determine if the boosted power assigned to the nodes on the critical path will compensate for the increased latency for the early nodes to wake up out of the power-gated state. If the boosted power will compensate for the increased latency caused by exiting the power-gated state, then the nodes which have finished early may be power-gated. Otherwise, if the boosted power will not compensate for the increased latency, the nodes which have finished early may not be power-gated.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
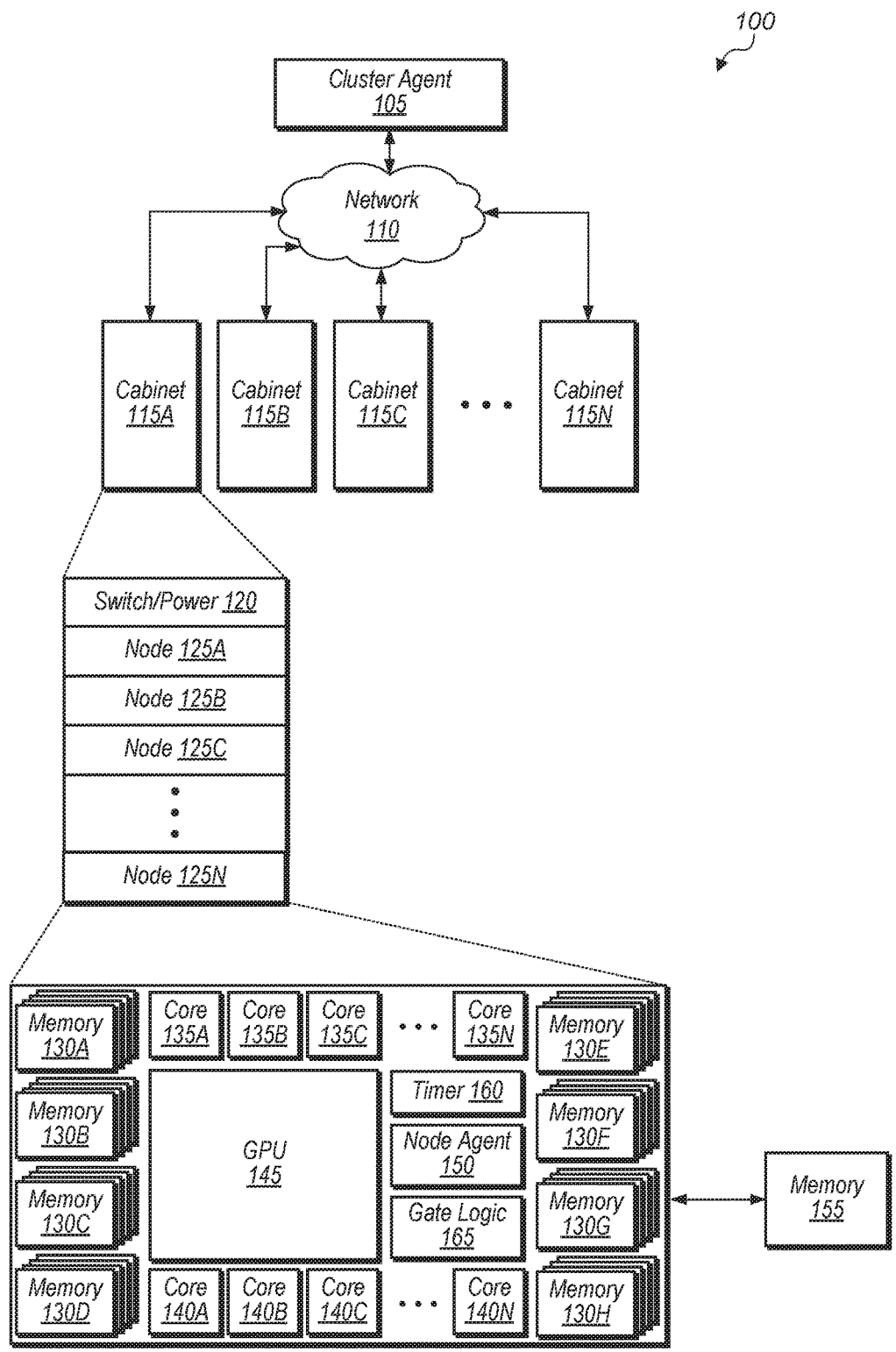
FIG. 1 is a block diagram of one embodiment of a computing system.

Referring now to FIG. 1, a block diagram illustrating one embodiment of a computing system 100 is shown. As shown in FIG. 1, system 100 may include cluster agent 105, network 110, and cabinets 115A-N. Each cabinet of cabinets 115A-N may include a plurality of nodes. In various embodiments, system 100 may be used to process and store data, perform computational tasks, and transmit data to other devices and systems using network 110 or another network. In one embodiment, system 100 may perform data processing on large datasets. For example, system 100 may be configured to execute any of various types of workloads (e.g., parallel processing applications, MapReduce operations, simulations, modeling applications) depending on the embodiment. System 100 may also be configured to work in various types of power constrained environments where the total amount of power allowed to be consumed by system 100 is capped. For example, system 100 may have a power cap of 'P' Watts or Megawatts, where 'P' may vary from embodiment to embodiment, and where system 100 is expected to limit total power consumption to be less than or equal to 'P' Watts. It is noted that system 100 may also be referred to as a supercomputer, data center, cluster, high performance computing (HPC) cluster, or cloud computing cluster.

In various embodiments, network 110 may include any number and type of networks (e.g., local area network (LAN), wide area network (WAN), wireless networks, an Intranet, the Internet, storage area network (SAN)). Examples of LANs include Ethernet networks, Fiber Distributed Data Interface (FDDI) networks, and token ring networks. Network 110 may also represent any type of wired or wireless connection medium. For example, wired mediums may include Ethernet, fiber channel, etc. Wireless connection mediums may include a wireless connection using a wireless communication protocol such as IEEE 802.11, a modem link through a cellular service, a satellite link, etc.

As shown in FIG. 1, cabinet 115A includes switch/power unit 120 and nodes 125A-N, which are representative of any number and type of nodes. Generally speaking, a node may be defined as an apparatus or system with at least one computing/processing element (e.g., processor, processor core, programmable logic device, application specific integrated circuit) and at least one memory device. The at least one computing element of the node may be configured to execute instructions and/or perform one or more types of computations (e.g., floating point, integer, memory, I/O) depending on the embodiment. Node 125N is shown with an expanded view in FIG. 1 to illustrate one example of a node which may be utilized in system 100. In other embodiments, other types of nodes with other numbers and types of processing elements and memory devices may be utilized.

In one embodiment, cluster agent 105 may be configured to manage the assignment of tasks to nodes, manage the assignment of power caps to each of the nodes, and/or perform other management functions. In one embodiment, cluster agent 105 may be implemented on one or more of the nodes of cabinets 115A-N. In another embodiment, cluster agent 105 may be implemented separately from cabinets 115A-N in system 100. The nodes within each cabinet 115A-N may be interconnected to one another through a switch (e.g., switch/power unit 120) and the cabinets 115A-N within system 100 may also be interconnected through a switch (not shown). The switch/power unit 120 may also be configured to provide power to the nodes of cabinet 115A. Alternatively, in another embodiment, there may be separate switch and power units, with power being provided to nodes 125A-N via a backplane or other mechanism. In some embodiments, there may be multiple switches and/or power units per cabinet.

In one embodiment, node 125N may include cores 135A-N, cores 140A-N, GPU 145, node agent 150, timer 160, gate logic 165 and memories 130A-H, which are representative of any number and type of memory devices. The components of node 125N may be interconnected by one or more communication buses. Cores 135A-N and cores 140A-N are representative of any number and any type of processing element (e.g., CPU, processor core, accelerated processing unit (APU)) and may be coupled to GPU 145. Cores 135A-N and cores 140A-N may have any number and type of caches (e.g., L1 cache, L2 cache). Cores 135A-N, cores 140A-N, and GPU 145 may be configured to execute instructions concurrently or in parallel. In one embodiment, cores 135A-N, cores 140A-N, and GPU 145 may share a virtual address space.

Various types of memories 130A-H may be utilized in system 100, including random-access memory (RAM), static RAM (SRAM), dynamic RAM (DRAM), high-speed CMOS, high-density DRAM, eDRAM, 3D stacked memory (e.g., stacked DRAM), interposer-based integrated memory, multi-chip modules (MCM), off-chip DRAM on a motherboard, non-volatile RAM (NVRAM), magneto-optical storage medium, read only memory (ROM), synchronous DRAM (SDRAM), double data rate SDRAM (DDR SDRAM), phase-change memory, spin-transfer torque magnetic RAM, memristor, extended data output (EDO) RAM, Rambus RAM, Rambus DRAM, erasable programmable memory (EEPROM), solid-state memory, hard disk drive, optical storage mediums, etc. In one embodiment, memories 130A-H may be DRAMs. Node 125N may be coupled to memory 155, which may be a NVRAM in one embodiment. In various embodiments, the memories 130A-H may store application software, communication libraries, operating system software, and/or other software and data.

In one embodiment, node 125N may include a vertical die stack of memory die with memories 130A-H and processor die with cores 135A-N, cores 140A-N, and GPU 145. The memory die may comprise a stacked memory device where the stacked die implement memory circuitry, such as DRAM, SRAM, ROM, and the like. The processor die may implement hard-wired logic and routing logic for accessing the memory circuitry of the stacked memory die. In various embodiments, node 125N may be fabricated using any of a variety of 3D integrated circuit fabrication processes. It is noted that in other embodiments, other configurations and structures of nodes may be utilized for nodes 125A-N.

In various embodiments, node agent 150 may be implemented using any suitable combination of hardware and/or software. Node agent 150 may be configured to communicate with other node agents on other nodes and with cluster agent 105. While node agent 150, timer 160, and gate logic 165 are shown as being located within node 125N, it should be understood that in some embodiments, one or more of node agent 150, timer 160, and gate logic 165 may be located externally (e.g., in switch/power unit 120) to node 125N. Additionally, in one embodiment, there may be one communication element (e.g., MPI rank or process identifiable by a process number or identifier) per node. In another embodiment, there may be more than one communication element per node (e.g., one communication element per core).

In one embodiment, node agent 150 may be configured to monitor the power status of node 125N and communicate the power status and other status (e.g., task completion status, wait status) to cluster agent 105. Node agent 150 may also be configured to power-gate node 125N in response to detecting one or more conditions. The one or more conditions may include one or more of: reaching a communication wait phase, receiving a request to power-gate the node from the cluster agent, predicting that an expected wait time is greater than a threshold, determining the one or more other nodes are not within a threshold of their thermal design power (TDP), and other conditions. The TDP of a node may be defined as the maximum amount of power generated by the node which the cooling system of the node is required to dissipate in typical operation. In one embodiment, there may be one node agent per node. In other embodiments, there may be one node agent for multiple nodes.

In one embodiment, when a node is power-gated, no current is supplied to the node, thereby reducing stand-by and leakage power consumption. For example, in one embodiment, a power supply on switch/power unit 120 for supplying power to node 125N may be connected to gate logic 165 on node 125N. The gate logic 165 may control the power supplied to node 125N and may gate the power provided to one or more components or the entirety of node 125N by opening one or more circuits to interrupt the flow of current to node 125N in response to signals or instructions provided by node agent 150. The gate logic 165 may also re-apply power to transition node 125N out of the power-gated state to an idle or active state by closing the appropriate circuits. However, power-gating can consume system resources. For example, power-gating may require flushing caches in the node's processor elements, which consumes both time and power. Power gating may also exact a performance cost (i.e., increase latency) to return the node to an active state.

In one embodiment, the terms "power-gate", or "power gate", may be defined as reducing the power consumption of an entity or element such as a processor, core, node, or otherwise. In various embodiments, reducing such power consumption may include shutting off or reducing a supply of current to the entity. As such, to power gate a processing element generally causes the processing element to enter a reduced power state. For a node with a plurality of processing elements, power-gating the node may be defined as power-gating a portion or the entirety of the plurality of processing elements of the node. In other embodiments, the term "power-gate" may be defined as reducing the power consumption of a processing element by reducing the supply voltage or frequency to the processing element, or otherwise causing the power consumption of the processing element to decrease.

In one embodiment, node agent 150 may be configured to communicate to cluster agent 105 when node 125N has finished processing a task of a given workload. When node 125N has completed its assigned task, node agent 150 may make a determination at that point in time whether to power-gate node 125N. In some embodiments, cluster agent 105 may make the determination whether to power-gate node 125N after being notified that node 125N has finished its task. If node 125N is power-gated, resulting in power savings for system 100, the power savings may be reassigned by cluster agent 105 to one or more other nodes of system 100. In one embodiment, cluster agent 105 may predict which node(s) are on the critical path, and cluster agent 105 may reassign the power savings to these node(s). By boosting the power to the node(s) on the critical path, these node(s) may complete their task(s) faster, resulting in faster processing of the given workload. As used herein, the phrase "on the critical path" when used to describe one or more nodes may be defined as the node(s) which will take the longest to complete their task(s) as compared to the other nodes. In one embodiment, cluster agent 105 may be able to predict which node(s) are on the critical path based on historical information associated with previously processed workloads. In other embodiments, cluster agent 105 may be able to predict which node(s) are on the critical path based on an analysis of the different tasks assigned to the various nodes of the cluster.

In one embodiment, cluster agent 105 and/or node agent 150 may be configured to track the history of computation durations and communication wait durations and to store these historical computation duration and communication wait duration values in one or more of memories 130A-H or memory 155. In various embodiments, cluster agent 105 and/or node agent 150 may be configured to generate a predication of a communication wait duration based on the historical computation duration and communication wait duration values. In some embodiments, the stored duration values may also identify a type of workload which was being processed when the communication wait duration occurred. This may be useful in differentiating between the different types of workloads which may have differing amounts of computation durations and communication wait durations.

In one embodiment, prior to power-gating node 125N, node agent 150 may set timer 160 to wake up the power-gated node 125N after a given duration has elapsed. In one embodiment, node agent 150 may calculate a duration value for setting timer 160 based on historical computation duration and communication wait duration values. In another embodiment, node agent 150 may receive a duration value from a cluster agent 105 for setting timer 160 based on information available to cluster agent 105. In a further embodiment, node agent 150 and cluster agent 105 may collaborate to generate an interval for setting timer 160 based on information available to both node agent 150 and cluster agent 105.

Figure 2:
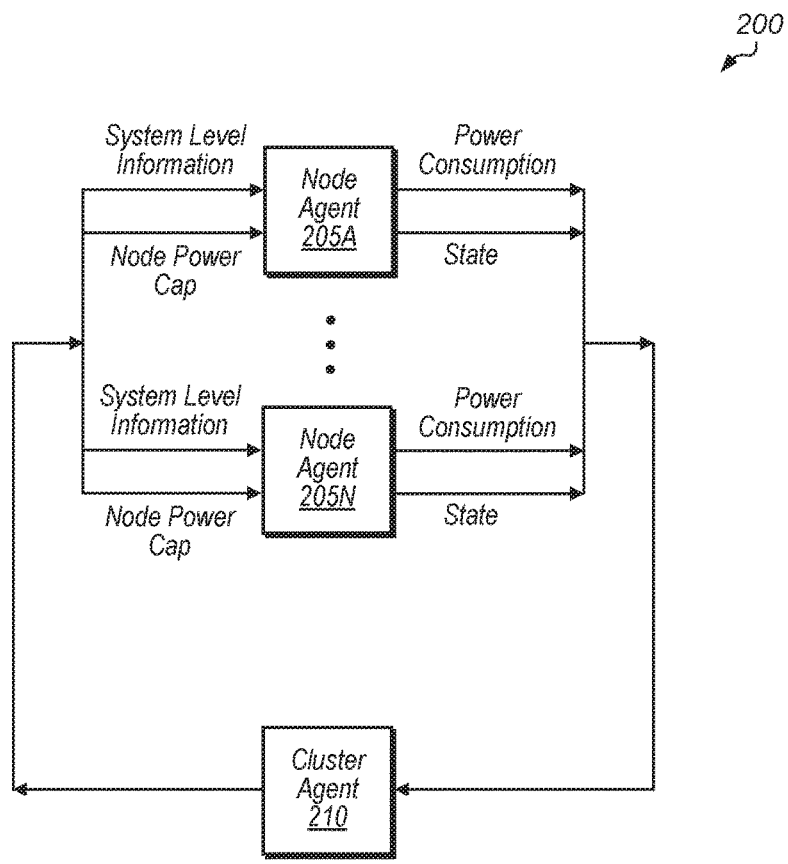
FIG. 2 is a logical block diagram of one embodiment of the communication elements of a cluster.

Referring now to FIG. 2, a logical block diagram of one embodiment of the communication elements of a cluster 200 is shown. A plurality of node agents 205A-N may be coupled to a cluster agent 210 for communicating, controlling the processing of tasks, and monitoring and managing the power consumption of the plurality of nodes of the cluster. It is noted that a cluster agent may be referred to more generally as a global agent and a node agent may be referred to more generally as a local agent.

In one embodiment, cluster agent 210 may be configured to convey system level information and a node power cap to each node agent 205A-N. The system level information may include power consumption levels of the other nodes, whether the other nodes are within a threshold amount of their thermal design power (TDP) limits, the global power cap, number of nodes still performing tasks, etc. In another embodiment, cluster agent 210 may be configured to convey only the node power cap to each node agent 205A-N.

In one embodiment, each node agent 205A-N may be configured to convey power consumption and state information to cluster agent 210. In another embodiment, cluster agent 210 may be able to monitor the power consumption of each node independently of the node agents 205A-N. Each node agent 205A-N may be configured to monitor and control the power consumption of a corresponding node to ensure that the power consumption of the node does not exceed the node's power cap. In one embodiment, each node agent 205A-N may be configured to power-gate the corresponding node based on detecting one or more conditions. These one or more conditions may include reaching a communication wait phase, receiving a request to power-gate the corresponding node from the cluster agent, predicting that an expected wait time is greater than a threshold, determining that a cost of the latency caused by power-gating is less than the performance increase gained by sharing power with other nodes on the critical path, determining that the other nodes are not within a threshold amount of their TDPs, waiting for a message from one or more other nodes, waiting on a cache miss, waiting on a response from memory, detecting a memory contention issue, waiting on a synchronization event, waiting on a barrier, or other events or conditions. In one embodiment, there may be one node agent 205A-N for each node. In another embodiment, there may be one node agent 205A-N for each processing element (e.g., core) of the nodes.

Each node agent 205A-N may be implemented using any suitable combination of hardware and/or software. In one embodiment, each node agent 205A-N may be implemented using only hardware such that all of the node's processing elements can be power-gated by the corresponding node agent 205. The plurality of node agents 205A-N may be coupled to cluster agent 210 using any of various types of interconnect protocols via any number and type of networks or other connection media. In one embodiment, each node agent 205A-N may be coupled to a network via a network interface card (NIC), and the cluster agent 210 may also be coupled to the node agents 205A-N via this network and/or one or more other networks. In one embodiment, each NIC may support both active polling and interrupt. Additionally, cluster agent 210 may have an out-of-band monitoring interface through which cluster agent 210 can probe and query power and compute information from each node without waking up the power-gated nodes.

Depending on the embodiment, there may be multiple ways for the node agent to make the decision on whether to power-gate the node. In a first embodiment, the node agent may use a history-based prediction to guess the duration of the communication or wait time. If the predicted duration has a high cost, the node agent may not put the node into a power-gated mode. On the other hand, if the cost is low, the node agent may allow the node to enter into the power-gated mode. In a second embodiment, cluster agent 210 may share information with the node agent so that the node agent is aware of the global power budget and the number of nodes in the system. The node can use this information to prevent power gating if the individual budget for each of the other nodes is close to its TDP, since in this case the other nodes would not be able to use any additional power. In a third embodiment, the node agent may actively poll the network through the NIC for a short period of time to avoid the huge performance penalty due to premature power gating. For messages that have waited beyond a specified time-out threshold, the node agent may initiate the power gating process and bring the node to the lowest power standby mode. The node may then be awakened from the power gated state by an interrupt.

When a rank is still executing an active task and there is additional available power shifted from other idle ranks, the node agent may boost the local frequency and voltage delivered to the node to fully utilize the additional power assigned to it by cluster agent 210. This frequency and voltage boost can expedite the tasks that are on the critical paths. Once another rank finishes its task, enters MPI wait, and eventually is power gated, the corresponding node agent may notify cluster agent 210 of its current status so that cluster agent 210 can claim its power credit and redistribute it to the remaining active ranks. Alternatively, cluster agent 210 may monitor the power consumption of the nodes and cluster agent 210 may determine that a node has been power-gated based on a detected drop in power consumption on the node.

In one embodiment, cluster agent 210 may be responsible for collecting power and performance data, as well as power gating status from each node. In some embodiments, cluster agent 210 may detect a power consumption drop at each rank and increase the total available cluster-level power credit. Whenever there is additional power credit available under the power cap, cluster agent 210 may distribute the additional power credit among the remaining active ranks. In one embodiment, cluster agent 210 may evenly distribute the total available power credit collected from the k power-gated ranks to all remaining active N-k ranks, where k and N are integers, and where N is the total number of nodes and where k is the number of power-gated nodes. In another embodiment, cluster agent 210 may distribute the total available power credit collected from the k power-gated ranks to those active ranks deemed to have the most difficult tasks to compute. This may help to better reduce total computation time by identifying those active ranks with the longest computation times rather than evenly distributing the total available power credit.

Each rank may have its own power limit specified by physical limits such as maximum silicon temperature, maximum supply voltage for reliable operation of circuits, and maximum allowed current and thermal power of voltage regulators, etc. For a large-scale system, one or more of the above schemes may not be scalable. Accordingly, for a large-scale system, a hierarchical scheme may be utilized with multiple levels of power credit collection and distribution.

In various embodiments, cluster agent 210 and node agents 205A-N may prioritize minimizing the number of messages exchanged among ranks during a collective synchronization. In one embodiment, minimizing the number of messages may be achieved by providing a queue on the NIC hardware that just wakes up a core when all the waiting messages arrive. In one embodiment, this synchronization protocol may be implemented in hardware. This approach may help provide a longer period of idleness that achieves increased benefits from the methods and mechanisms described herein.

In one embodiment, a first node may finish its task early and notify cluster agent 210. Cluster agent 210 may determine how much computation time will decrease on a second node if extra power saved by power-gating the first node is reassigned to the second node. Cluster agent 210 may also determine how much latency will increase on the first node if the first node is power-gated. If the decrease in computation time on the second node is greater than the increase in latency on the first node, then cluster agent 210 may cause the first node to be power-gated. In one embodiment, the cluster agent 210 may send, to the first node, a request that the first node be power-gated. On the other hand, if the decrease in computation time on the second node is less than the increase in latency on the first node, cluster agent 210 may prevent the first node from being power-gated.

Figure 3:
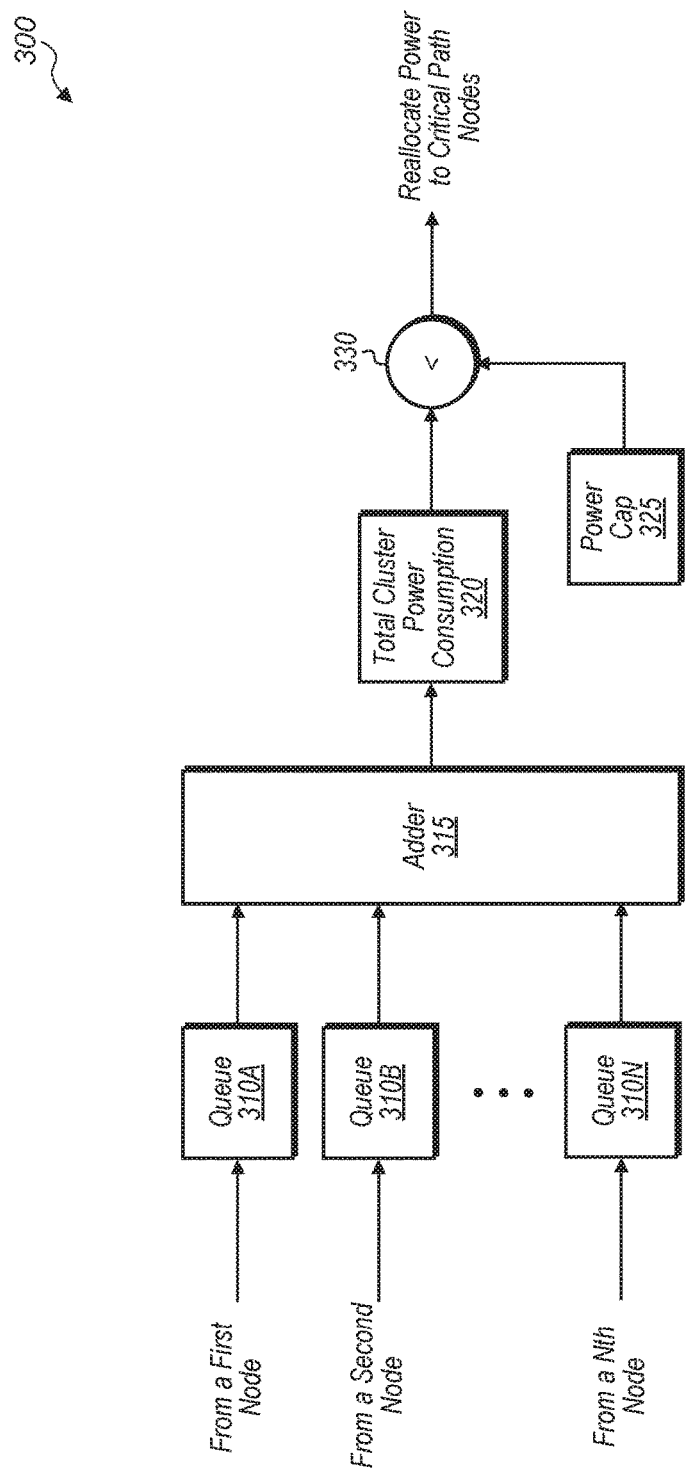
FIG. 3 is a block diagram of one embodiment of a portion of the logic of a cluster agent.

Referring now to FIG. 3, a block diagram of one embodiment of a portion of the logic of a cluster agent 300 is shown. In various embodiments, the logic of cluster agent 300 may be included as part of cluster agent 105 of FIG. 1 or cluster agent 210 of FIG. 2. Cluster agent 300 may also include other logic which is not shown to avoid obscuring the figure. Cluster agent 300 may be coupled to a plurality of nodes (not shown), and in one embodiment, cluster agent 300 may utilize dedicated logic to determine the power consumption of the plurality of nodes. In other embodiments, cluster agent 300 may calculate the power consumption of the plurality of nodes using software or a combination of hardware and software.

In one embodiment, each node of the plurality of nodes may be coupled to a corresponding queue 310A-N of cluster agent 300 for storing power consumption data of the respective node. In one embodiment, dedicated circuitry on each node may be configured to detect and/or calculate the power consumption of the node and convey this data to a corresponding queue 310A-N. This power consumption data may be updated on regular intervals, where the duration of the interval may be programmable and may vary from embodiment to embodiment. Each queue 310A-N is representative of any type of queue, buffer, or other storage element for storing power consumption data conveyed or retrieved from a corresponding node 305A-N. Each queue 310A-N may also be coupled to adder 315 which may be configured to generate a sum of the inputs from queues 310A-N, where the sum is representative of the total cluster power consumption 320. In some embodiments, adder 315 may also add a value indicative of the power consumption of other circuitry (besides just the nodes) within the cluster to generate the total power consumed by the cluster. Alternatively, if the power consumption of the other non-node circuitry is relatively constant, this power consumption may be accounted for by adjusting the power cap 325 accordingly, where power cap 325 is used for comparing against the total cluster power consumption 320.

In one embodiment, cluster agent 300 may be configured to utilize comparison logic 330 to compare the total cluster power consumption 320 to the power cap 325. If the total cluster power consumption 320 is less than power cap 325 by a programmable threshold, then cluster agent 300 may be configured to reassign the unused power savings to the active nodes or the nodes on the critical path of the workload. If total cluster power consumption 320 is within a programmable threshold of power cap 325, then cluster agent 300 may maintain the current power assignment.

Figure 4:
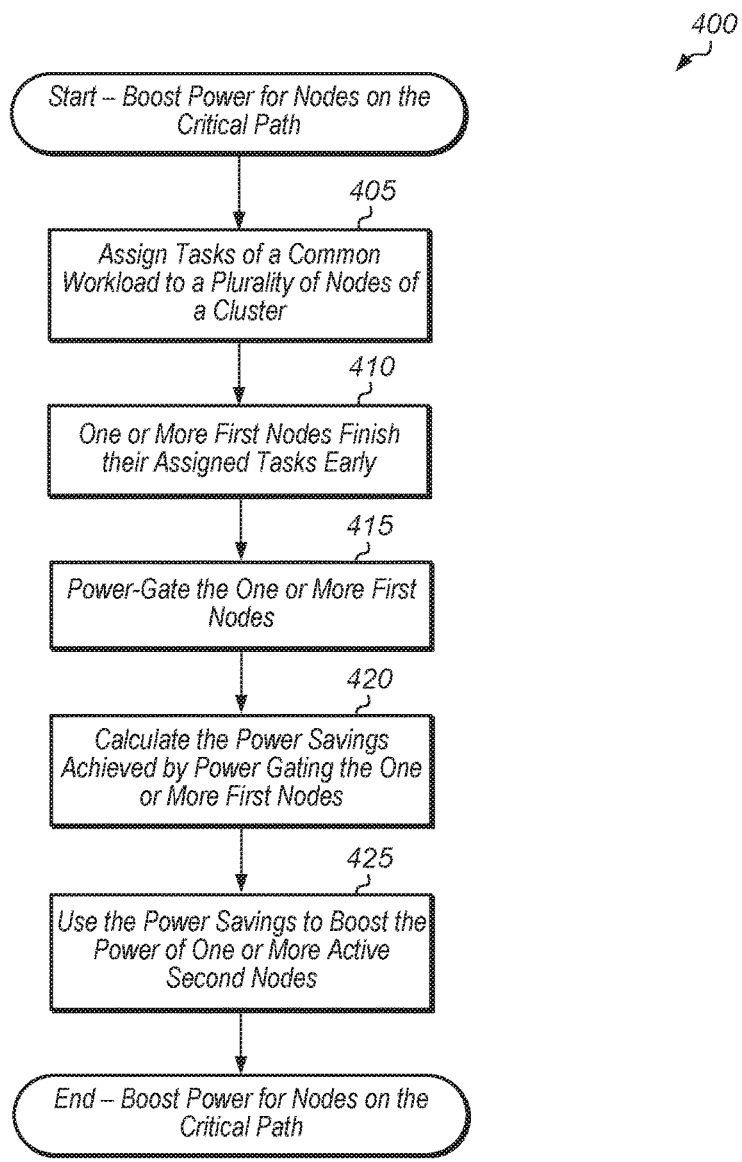
FIG. 4 is a generalized flow diagram illustrating one embodiment of a method for boosting power for nodes on the critical path to speed up overall execution.

Turning now to FIG. 4, one embodiment of a method 400 for boosting power for nodes on the critical path to speed up overall execution is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various agents (node and/or cluster), nodes, apparatuses, or systems described herein may be configured to implement method 400.

A plurality of nodes of a cluster may be assigned tasks to perform of a common workload (block 405). The common workload may be any of various types of parallel processing applications. In one embodiment, the cluster may be operating in a power-constrained environment where the allowable power consumption of the cluster is capped. Next, one or more first nodes may finish their assigned tasks early (block 410). In response to the one or more first nodes finishing their assigned tasks early, the one or more first nodes may be power-gated (block 415). Next, the power savings achieved by power-gating the one or more first nodes may be calculated (block 420). In one embodiment, a cluster agent may be configured to calculate the power savings achieved by power-gating the one or more first nodes. Then, the power savings may be used to boost the power consumption of one or more active second nodes (block 425). After block 425, method 400 may end. By boosting the power consumption of one or more second nodes which are on the critical path, the overall execution of the workload may be expedited.

Figure 5:
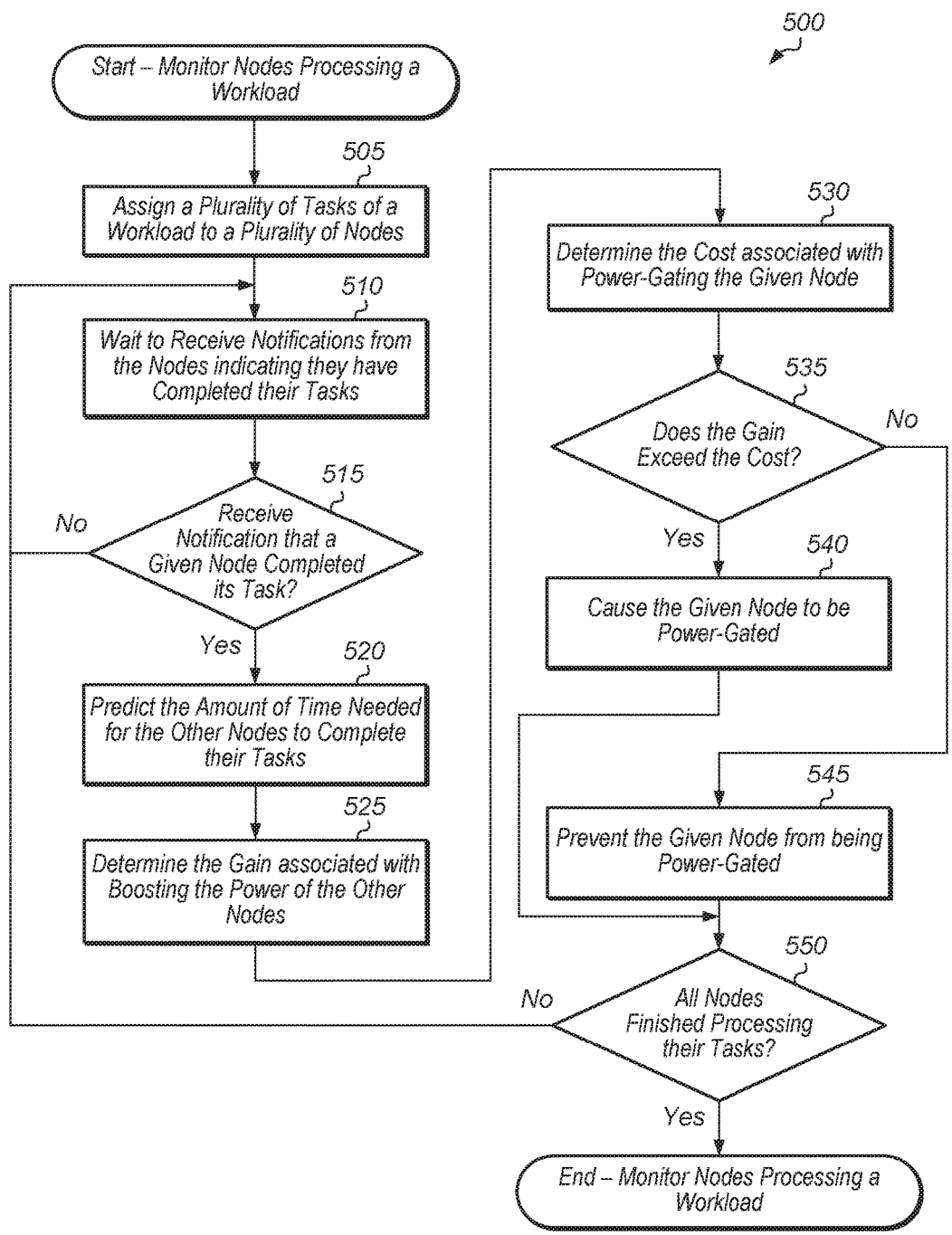
FIG. 5 is a generalized flow diagram illustrating another embodiment of a method for monitoring nodes processing a workload.

Referring now to FIG. 5, one embodiment of a method 500 for monitoring nodes processing a workload is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various agents (node and/or cluster), nodes, apparatuses, or systems described herein may be configured to implement method 500.

A cluster agent may assign a plurality of tasks of a workload to a plurality of nodes (block 505). The cluster agent may then wait to receive notifications from the nodes indicating they have completed their respective tasks (block 510). If the cluster agent receives a notification from a given node that the given node has completed its task (conditional block 515, "yes" leg), then the cluster agent may predict the amount of time needed for the other nodes to complete their tasks (block 520). In another embodiment, the node agent of the given node may predict the amount of time needed for the other nodes to complete their tasks. In one embodiment, the cluster and/or node agent may utilize a history based approach to predict the amount of time needed for the other nodes to complete their tasks. If the cluster agent does not receive an indication that any of the nodes have completed their tasks (conditional block 515, "yes" leg), then method 500 may return to block 510.

After predicting the amount of time needed for the other nodes to complete their tasks in block 520, the cluster and/or node agent may determine the performance increase associated with boosting the power of the other nodes (block 525). In one embodiment, determining the performance increase may comprise predicting how much time will be saved by the other nodes (i.e., how much computation time will decrease) if the given node is power-gated and the other nodes are given the extra power from the given node. Next, the cluster and/or node agent may determine the performance decrease or cost (e.g., latency) associated with power-gating the given node (block 530). In one embodiment, determining the cost may comprise calculating the latency (i.e., amount of time) by having to wake up the given node from the power-gated state upon receipt of a message or occurrence of another event. If the gain associated with boosting the power of the other nodes is greater than the cost associated with power-gating the given node (conditional block 535, "yes" leg), then the cluster agent may cause the given node to be power-gated (block 540). If the cost associated with power-gating the given node is greater than the gain associated with boosting the power of the other nodes (conditional block 535, "no" leg), then the cluster agent may prevent the given node from being power-gated (block 545). After blocks 540 and 545, the cluster agent may determine if all nodes have finished processing their tasks (conditional block 550). If there are one or more nodes still processing their tasks (conditional block 550, "no" leg), then method 500 may return to block 510. If all of the nodes have finished processing their tasks (conditional block 550, "yes" leg), then method 500 may end.

Figure 6:
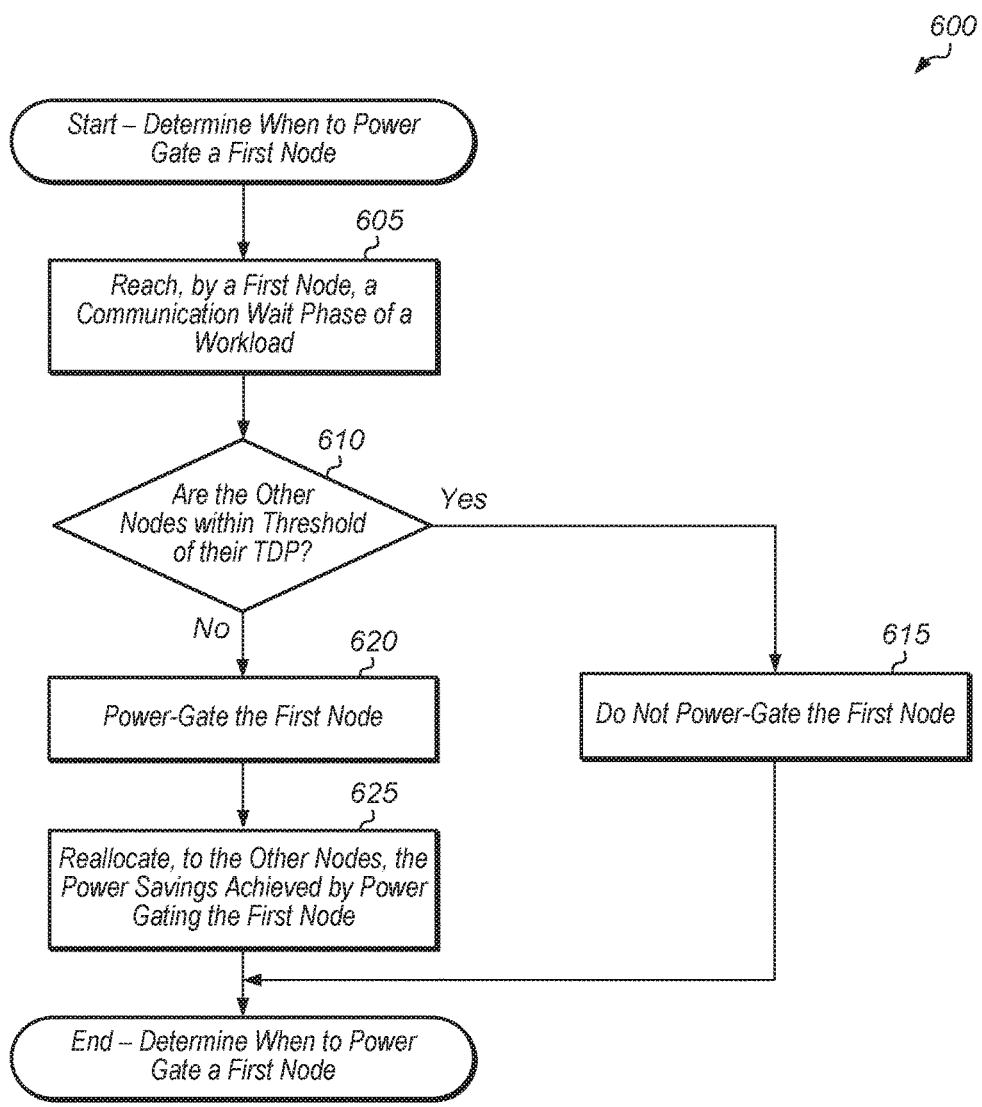
FIG. 6 is a generalized flow diagram illustrating one embodiment of a method for determining when to power-gate a first node.

Turning now to FIG. 6, one embodiment of a method 600 for determining when to power-gate a first node is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various agents (node and/or cluster), nodes, apparatuses, or systems described herein may be configured to implement method 600.

A first node may reach a communication wait phase of a workload (block 605). In one embodiment, the first node may be part of a cluster of a plurality of nodes, where a portion or the entirety of the plurality of nodes are assigned separate tasks to perform. Next, it may be determined if the other nodes still performing their tasks are within a threshold amount of their TDP (conditional block 610). In various embodiments, the first node and/or a cluster agent may determine if the other nodes still performing their tasks are within a threshold amount of their TDP. If the other nodes are within a threshold amount of their TDP (conditional block 610, "yes" leg), then the first node may not be power-gated (block 615). If the other nodes are within a threshold amount of their TDP, then assigning the other nodes additional power will not generate a performance boost since the other nodes will not be able to use this additional power. If the other nodes are not within a threshold amount of their TDP (conditional block 610, "no" leg), then the first node may be power-gated (block 620). Next, the power savings achieved by power-gating the first node may be reassigned to the other nodes (block 625). After blocks 615 and 625, method 600 may end.

Figure 7:
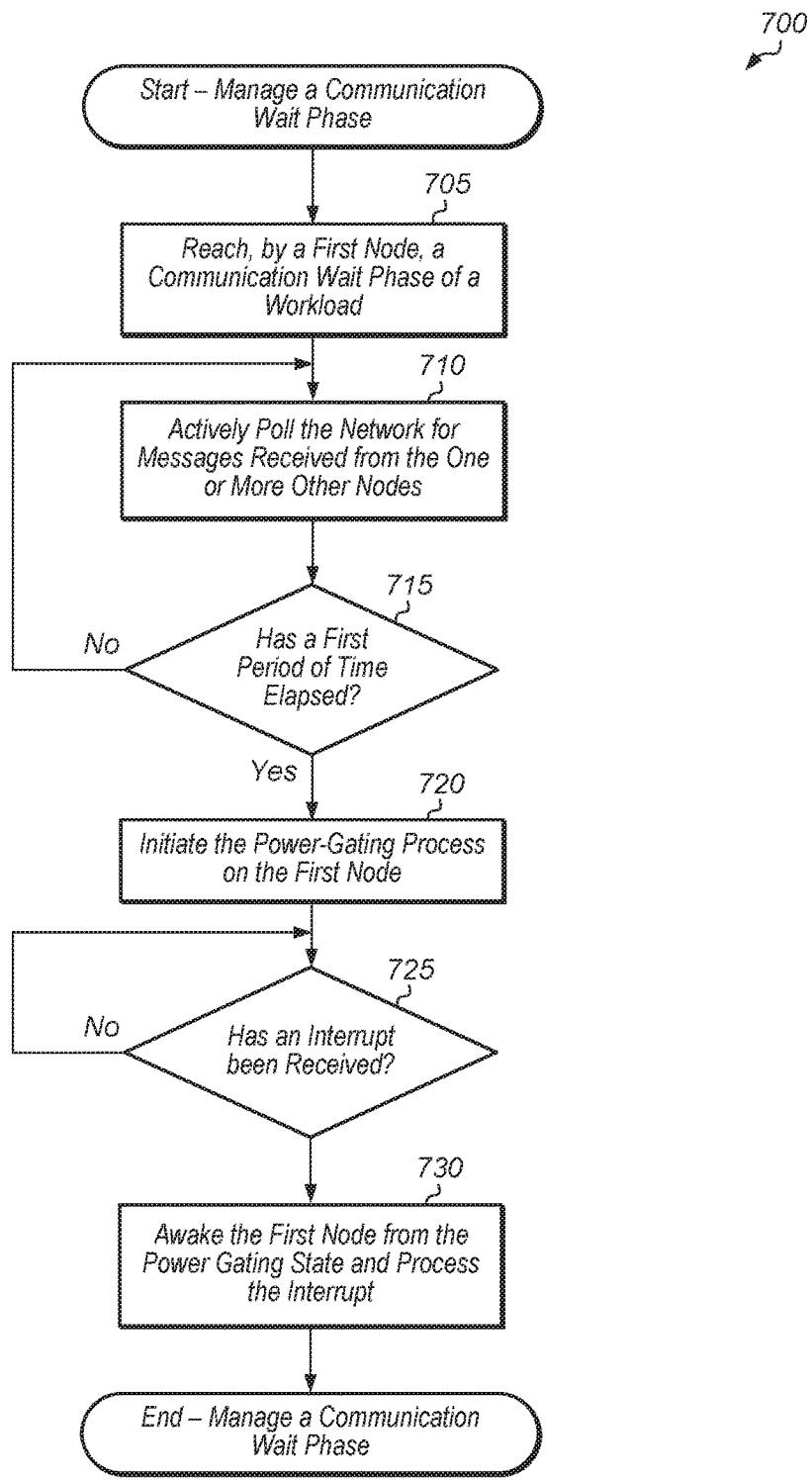
FIG. 7 is a generalized flow diagram illustrating another embodiment of a method for managing a communication wait phase.

Referring now to FIG. 7, one embodiment of a method 700 for managing a communication wait phase is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various agents (node and/or cluster), nodes, apparatuses, or systems described herein may be configured to implement method 700.

A first node may reach a communication wait phase of a workload (block 705). In one embodiment, the first node may be part of a cluster of a plurality of nodes, where a portion or the entirety of the plurality of nodes are assigned separate tasks to perform. Next, the first node may actively poll the network for messages received from the one or more other nodes (block 710). Then, the first node may determine if a first period of time has elapsed since the first node reached the communication wait phase (conditional block 715). If a first period of time has elapsed (conditional block 715, "yes" leg), then the first node may initiate the power-gating process (block 720). The first period of time may be programmable and may vary according to the embodiment. If the first period of time has not elapsed (conditional block 715, "no" leg), then method 700 may return to block 710 with the first node continuing to actively poll the network.

After initiating the power-gating process in block 720, the first node may determine if an interrupt has been received (conditional block 725). If an interrupt has been received (conditional block 725, "yes" leg), then the first node may awake from the power-gating state and process the interrupt (block 730). If an interrupt has not been received (conditional block 725, "no" leg), then method 700 may remain at conditional block 725 and the first node may remain in the power-gated state. After block 730, method 700 may end.

Figure 8:
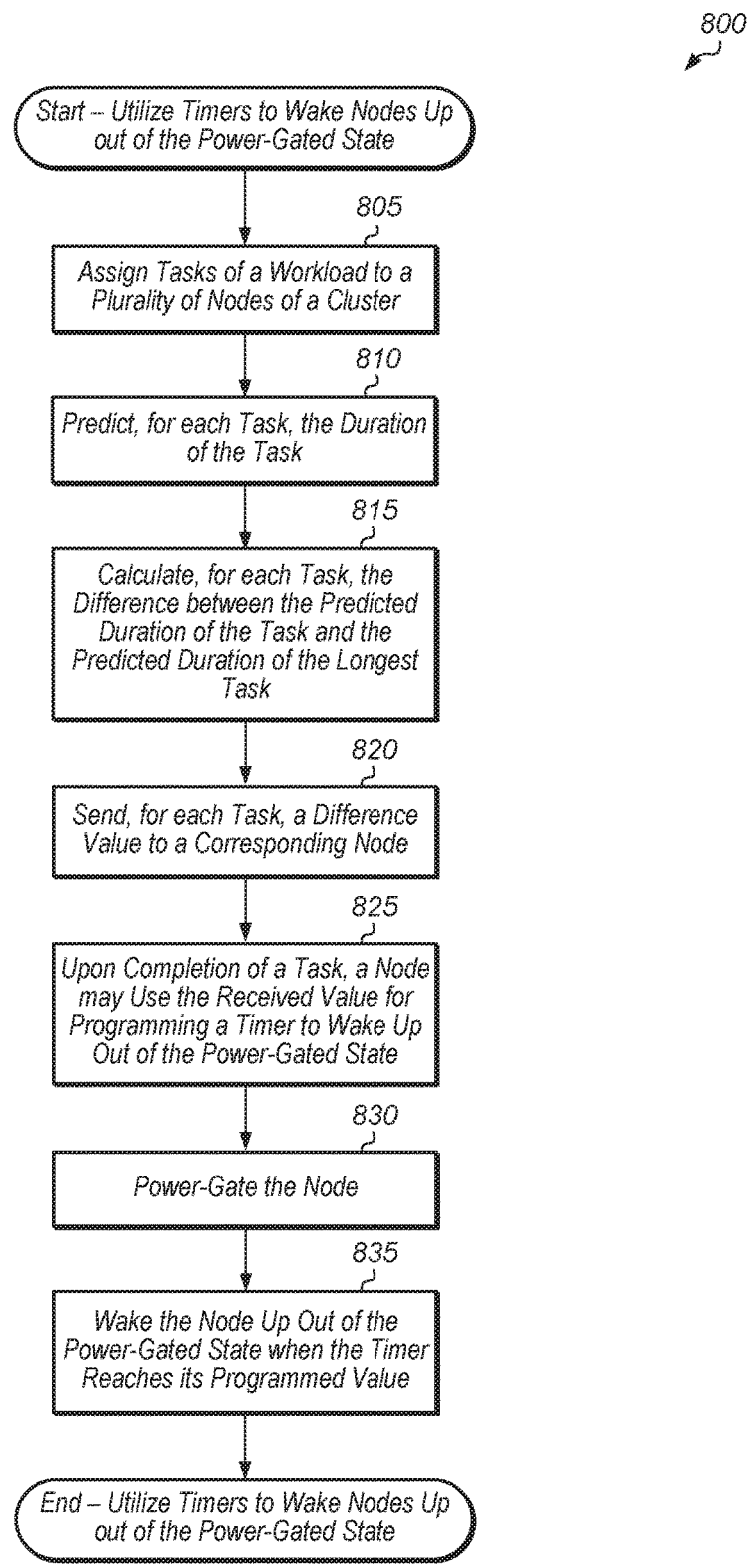
FIG. 8 is a generalized flow diagram illustrating one embodiment of a method for utilizing timers to wake nodes up out of the power-gated state.

Turning now to FIG. 8, one embodiment of a method 800 for utilizing timers to wake nodes up out of the power-gated state is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various agents (node and/or cluster), nodes, apparatuses, or systems described herein may be configured to implement method 800.

A cluster agent may be configured to assign tasks of a workload to a plurality of nodes of the cluster (block 805). For each task, the cluster agent may predict the duration of the task (block 810). In one embodiment, the cluster agent may base the predictions on historical values of task durations generated from previous workloads. Alternatively, in another embodiment, the cluster agent may base the predictions on an analysis of the complexity of each task of the different tasks of the workload. Then, for each task, the cluster agent may calculate the difference between the predicted duration of the task and the predicted duration of the longest task of the workload (block 815). For each task, the cluster agent may send the difference value to a corresponding node (block 820). In some embodiments, the cluster agent or node may reduce the difference value by a small amount so that the node will wake up shortly before a message arrives or synchronization event occurs. Upon completion of its assigned task, each node may use the received value to program a timer to wake up out of the power-gated state (block 825). The node may then be power-gated (block 830). When the timer reaches its programmed value, the node may be woken up out of the power-gated state (block 835). After block 835, method 800 may end.

Figure 9:
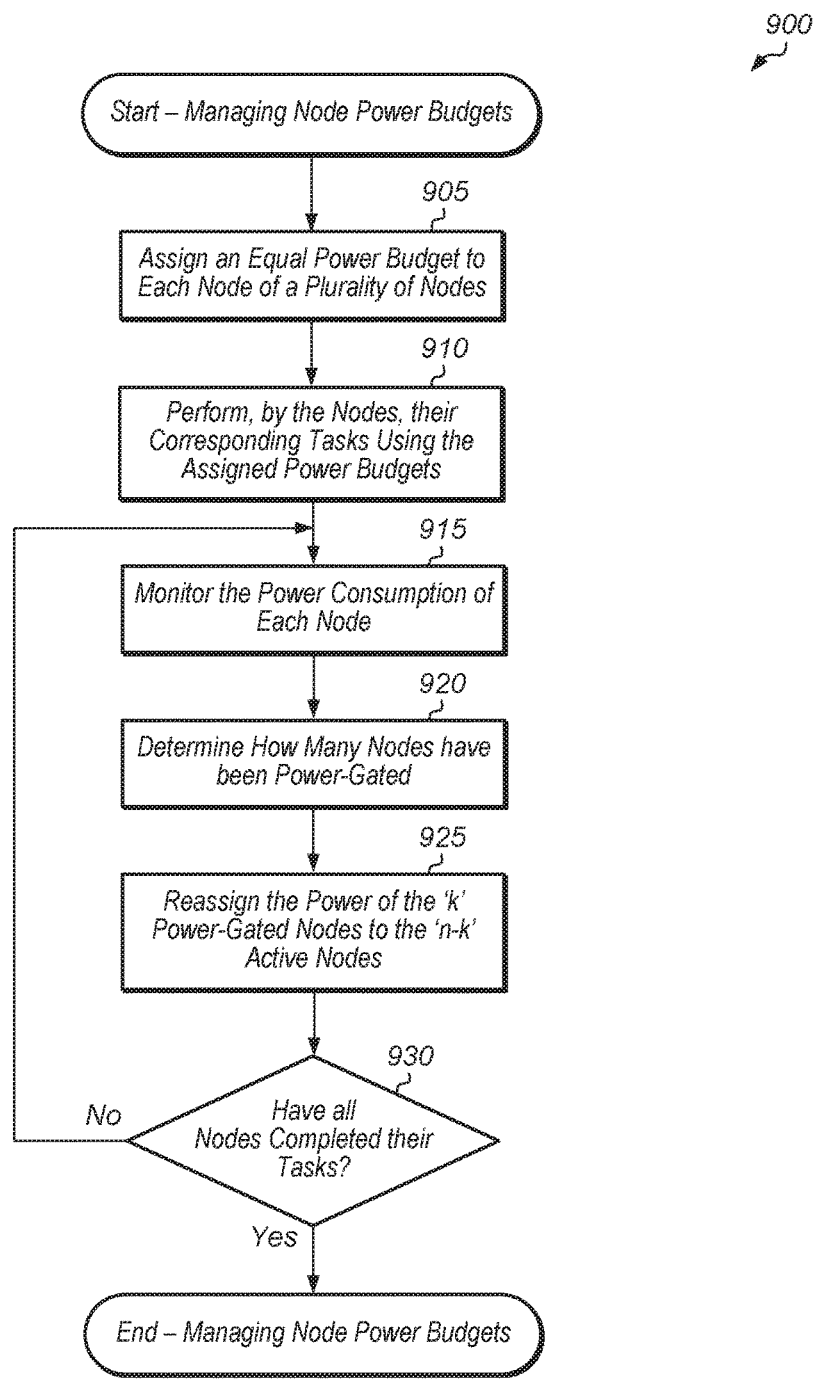
FIG. 9 is a generalized flow diagram illustrating another embodiment of a method for managing node power budgets.

Referring now to FIG. 9, one embodiment of a method 900 for managing node power budgets is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various agents (node and/or cluster), nodes, apparatuses, or systems described herein may be configured to implement method 900.

A cluster agent may assign an equal power budget to each node of a plurality of nodes, such that each node is assigned an equal amount of power as the other nodes of the plurality of nodes (block 905). Then, the nodes may perform their corresponding tasks using the assigned power budgets (block 910). As nodes complete their tasks, the nodes which have finished their tasks may be power-gated, and the cluster agent may monitor the power consumption of each node (block 915). While monitoring the power consumption of each node, the cluster agent may determine how many nodes have been power-gated (block 920). For the purposes of this discussion, it may be assumed that the total number of nodes is 'n' and the number of nodes that are power-gated is equal to 'k', where 'n' and 'k' are integers. The cluster agent may then reassign the power of the 'k' power-gated nodes to the 'n-k' active nodes which are not power-gated (block 925). In one embodiment, the cluster agent may reassign the power of the 'k' power-gated nodes equally to the 'n-k' remaining nodes such that each of the 'n-k' remaining nodes receives an equal amount of additional power. If all nodes have completed their tasks (conditional block 930, "yes" leg), then method 900 may end. If all nodes have not completed their tasks (conditional block 930, "no" leg), then method 900 may return to block 915 with the cluster agent continuing to monitor the power consumption of each node.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising: a plurality of nodes, each of the nodes comprising circuitry configured to: execute computing processes; calculate power consumption of the node; and store power consumption data of the node in a storage device; a cluster agent configured to: monitor a power usage of each of the plurality of nodes based at least in part on the power consumption data; track historical computation durations; assign a power budget to each node of the plurality of nodes; predict, based at least in part on the historical computation durations, how much performance would decrease on a first node due to an increased latency from having to wake from a power-gated state; and increase on a second node, if power were to be reassigned from the first node to the second node; if said increase in performance is determined to be greater than said decrease in performance: cause the first node to enter the power-gated state; and reassign power saved by power-gating the first node to the second node.

2. The system as recited in claim 1, wherein predicting said decrease in performance on the first node comprises calculating a latency caused by having to wake the first node from the power-gated state, and wherein predicting said increase in performance on the second node comprises predicting a reduced amount of computation time if power is reassigned from the first node to the second node.

3. The system as recited in claim 1, wherein each node of the plurality of nodes comprises a node agent configured to power-gate a corresponding node responsive to detecting one or more conditions.

4. The system as recited in claim 3, wherein the one or more conditions comprise one or more of reaching a communication wait phase, predicting that an expected wait time is greater than a threshold, and determining the one or more other nodes are not within a threshold of their thermal design power.

5. The system as recited in claim 3, wherein each node agent is further configured to predict an expected wait time responsive to a corresponding node finishing an assigned task.

6. The system as recited in claim 3, wherein each node agent is further configured to poll a network for a message for a first period of time responsive to reaching a communication wait phase, and wherein the one or more conditions comprise the first period of time elapsing after reaching the communication wait phase.

7. A method comprising: assigning, by a cluster agent, a power budget to each node of a plurality of nodes of a computing system; calculating power consumption of each of the plurality of nodes; and storing power consumption data of each of the plurality of nodes in a storage device; monitoring a power usage of each of the plurality of nodes based at least in part on the power consumption data; tracking historical computation durations; predicting, based at least in part on the historical computation durations, how much performance would decrease on a first node due to an increased latency from having to wake from a power-gated state; and increase on a second node, if power were to be reassigned from the first node to the second node; if said increase in performance is determined to be greater than said decrease in performance: causing the first node to enter the power-gated state; and reassigning, by the cluster agent, power saved by power-gating the first node to the second node.

8. The method as recited in claim 7, wherein predicting said decrease in performance on the first node comprises calculating a latency caused by having to wake the first node from the power-gated state, and wherein predicting said increase in performance on the second node comprises predicting a reduced amount of computation time if power is reassigned from the first node to the second node.

9. The method as recited in claim 7, wherein each node of the plurality of nodes comprises a node agent, the method further comprising:
the node agent power-gating a corresponding node responsive to detecting one or more conditions.

10. The method as recited in claim 9, wherein the one or more conditions comprise one or more of reaching a communication wait phase, predicting that an expected wait time is greater than a threshold, and determining the one or more other nodes are not within a threshold of their thermal design power.

11. The method as recited in claim 9, further comprising:
predicting an expected wait time responsive to a corresponding node finishing an assigned task.

12. The method as recited in claim 9, further comprising:
polling a network for a message for a first period of time responsive to reaching a communication wait phase, and wherein the one or more conditions comprise the first period of time elapsing after reaching the communication wait phase.

13. A non-transitory computer readable storage medium storing program instructions, wherein the program instructions are executable by a processor to: assign a power budget to each node of a plurality of nodes of a computing system; calculate power consumption of each of the plurality of nodes; store power consumption data of each of the plurality of nodes in a storage device; monitor a power usage of each of the plurality of nodes based at least in part on the power consumption data; track historical computation durations; predict, based at least in part on the historical computation durations, how much performance would decrease on a first node due to an increased latency from having to wake from a power-gated state; and increase on a second node, if power were to be reassigned from the first node to the second node; if said increase in performance is determined to be greater than said decrease in performance: cause the first node to enter the power-gated state; and reassign power saved by power-gating the first node to the second node.

14. The non-transitory computer readable storage medium as recited in claim 13, wherein predicting said decrease in performance on the first node comprises calculating a latency caused by having to wake the first node from the power-gated state, and wherein predicting said increase in performance on the second node comprises predicting a reduced amount of computation time if power is reassigned from the first node to the second node.

15. The non-transitory computer readable storage medium as recited in claim 13, wherein each node of the plurality of nodes comprises a node agent, and wherein the program instructions are further executable by a processor to power-gate a corresponding node responsive to detecting one or more conditions.

16. The non-transitory computer readable storage medium as recited in claim 15, wherein the one or more conditions comprise one or more of reaching a communication wait phase, predicting that an expected wait time is greater than a threshold, and determining the one or more other nodes are not within a threshold of their thermal design power (TDP).

17. The non-transitory computer readable storage medium as recited in claim 15, wherein the program instructions are further executable by a processor to predict an expected wait time responsive to a corresponding node finishing an assigned task.

* * * * *